United States Patent [19]

Akazawa et al.

[11] 4,092,667
[45] May 30, 1978

[54] AUTOMATIC CHROMINANCE CONTROL AND COLOR KILLER CIRCUITS

[75] Inventors: Susumu Akazawa, Ichikawa; Takao Tsuchiya, Fujisawa; Kyoichi Murakami, Chigasaki; Takashi Okada, Yamato, all of Japan

[73] Assignee: Sony Corporation, Tokyo, Japan

[21] Appl. No.: 787,155

[22] Filed: Apr. 13, 1977

[30] Foreign Application Priority Data

Apr. 20, 1976 Japan ................................ 51-45197

[51] Int. Cl.² .......................................... H04N 9/49
[52] U.S. Cl. ....................................... 358/26; 358/27
[58] Field of Search ................................. 358/26, 27

[56] References Cited
U.S. PATENT DOCUMENTS

| | | | |
|---|---|---|---|
| 2,894,061 | 7/1959 | Oakley et al. | 358/27 |
| 2,956,112 | 10/1960 | O'Toole | 358/26 |
| 3,982,273 | 9/1976 | Cochran | 358/27 |

*Primary Examiner*—John C. Martin

*Attorney, Agent, or Firm*—Lewis H. Eslinger; Alvin Sinderbrand

[57] ABSTRACT

An automatic chrominance control and color killer circuit for use in a color television receiver having a gain controllable chrominance amplifier for selectively amplifying chrominance signals and a color burst signal transmitted with a composite television signal during a color television transmission. The circuit further has a burst level detector connected to the chrominance amplifier, a control circuit including a time constant circuit connected to the burst level detector for deriving a control signal, which is supplied to the chrominance amplifier for controlling the gain thereof in response to the level of the control signal during the presence of the burst signal and for activating and inactivating the chrominance amplifier when the level of the control signal goes over and below a predetermined level, and a circuit connected between the burst level detector and the time constant circuit for shortening the time constant of the latter when the level of an output signal of the former goes below a predetermined level.

2 Claims, 2 Drawing Figures

४,०९२,६६७

AUTOMATIC CHROMINANCE CONTROL AND COLOR KILLER CIRCUITS

BACKGROUND OF THE INVENTION

1. Field of the Invention

This invention relates generally to a chrominance signal processing circuit, and more particularly to an automatic chrominance control (ACC) circuit and an automatic color killer (ACK) circuit for use in a color television receiver, such a circuit being conveniently realizable in an integrated circuit form.

2. Description of the Prior Art

In the chrominance channel of a conventional color television reciever, there are provided an automatic chrominance control (ACC) circuit and an automatic color killer (ACK) circuit, respectively. The ACC and ACK circuits are operated by the color burst signal transmitted with a composite television signal in response to the level thereof, respectively, such that the ACC circuit operates to render the level of a chrominance signal in the composite signal constant, and the ACK circuit operates to render the chrominance channel inactive upon a monochrome television transmission or when the level of the color burst signal becomes lower than a predetermined level and hence to avoid the appearance of so-called color noise on a reproduced picture on a color cathode ray tube.

As an example of the prior art, there is proposed circuitry in which burst level detectors are provided separately as ACC and ACK circuits, respectively. Such prior art circuitry is complicated in its circuit elements and requires the use of separate time constant circuits in producing control voltages for the ACC and ACK operations, respectively, which results in the necessity of a number of external terminals when the circuitry is made as an integrated circuit.

As another example of the prior art, there is provided a common burst level detector for both the ACC and ACK circuits. In this case, the output signal from the common burst level detector is used to control the gain of the chrominance amplifier and to render the chrominance channel inactive upon monochrome television transmission or when the color burst level goes below a predetermined level. This example is of simple circuit construction and requires only one time constant circuit for deriving a control voltage from the burst level detector, so that the circuitry of this example can be easily made as an integrated circuit.

In such prior art circuitry, in order to make the characteristics of the ACC circuit good, the time constant of the time constant circuit must be selected to be relatively long. This will mean that the ACK circuit is not made operative immediately after a color signal transmission is changed to a monochrome signal transmission and, hence, the chrominance amplifier remains operative for some time period after the change of transmission. As a result, color noise appears on the monochrome picture reproduced on the color cathode ray tube for that time period.

OBJECTS AND SUMMARY OF THE INVENTION

An object of the present invention is to provide novel ACC and ACK circuitry.

Another object of the invention is to provide ACC and ACK circuitry which is free from the defects encountered in the prior art.

A further object of the invention is to provide ACC and ACK circuitry in which a common control voltage to the ACC and ACK circuits is used.

According to an aspect of the present invention there is provided an apparatus for use in a color television receiver of the type including circuitry for processing a composite television signal, said receiver having a gain controllable chrominance amplifier for selectively amplifying chrominance signals and a color burst signal transmitted with said composite signal during a color television transmission which comprises a burst level detector connected to said chrominance amplifier, a control circuit including a time constant circuit connected to said burst level detector for deriving a control signal, a first supply circuit for supplying said control signal to said chrominance amplifier for controlling the gain thereof according to the level of said control signal during the presence of said burst signal, a second supply circuit for supplying said control signal to said chrominance amplifier for activating the same when the level of said control signal goes over a predetermined level and inactivating the same when the level of said control signal goes below said predetermined level, and a circuit connected between said burst level detector and said time constant circuit for shortening the time constant of the latter when the level of the output signal of the former goes below a predetermined level.

Various other objects, features and advantages of the present invention will become apparent from the following description taken in conjunction with the accompanying drawings.

DESCRIPTION OF THE PREFERRED EMBODIMENT

Figure 1:
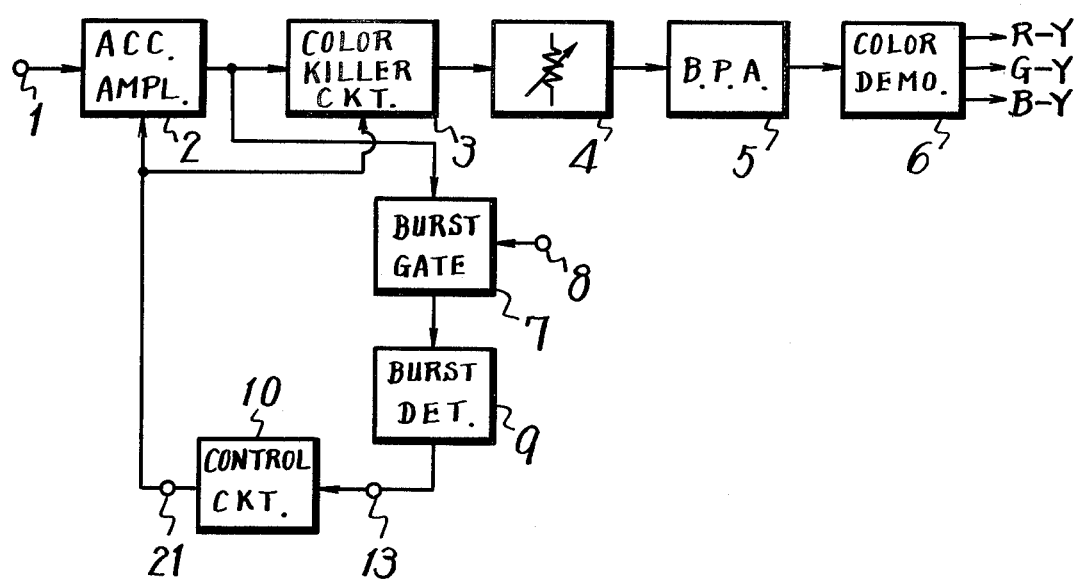
FIG. 1 is a block diagram showing a part of a color television receiver to which the present invention is applicable.

In FIG. 1, there is shown a part of a color television receiver in a simplified block diagram to which the present invention is applicable.

In FIG. 1, 1 designates an input terminal which is supplied with a chrominance signal separated from a composite color television signal and containing a color burst signal. The chrominance signal is then applied from the input terminal 1 to a chrominance amplifier, namely, ACC amplifier 2 whose gain is varied, for example, decreased as the level of a control voltage proportional to the level of the color burst signal becomes high. The output signal of the ACC amplifier 2 is supplied to a color killer circuit 3 which renders the chrominance channel inactive when the control voltage goes below a predetermined value. The output signal of the color killer circuit 3 is supplied through a color level adjusting circuit 4 and a band pass amplifier 5 to a color demodulator circuit 6 which produces color difference signals R-Y, G-Y and B-Y. The output signal of the ACC amplifier 2 is further supplied to a burst gate circuit 7 which is also supplied with a burst gate pulse from a terminal 8, so that the color burst signal is gated by the burst gate pulse through the burst gate circuit 7 and hence only the color burst signal is supplied to a color burst detector 9.

Thus, the burst detector circuit 9 produces a voltage which is varied in accordance with the level of the color burst signal. The detected voltage from the burst detector circuit 9 is supplied through an input terminal 13 to a control circuit 10 which includes a time constant circuit. Thus, the control circuit 10 produces at its output terminal 21 a DC control voltage in proportion to the level of the color burst signal. The control voltage from the control circuit 10 is applied through the output terminal 21 to the ACC amplifier 2 and to the color killer circuit 3 to control the same. By way of example, if the level of the color burst signal is high, the level of the control voltage becomes high and hence an ACC operation is carried out such that the gain of the ACC amplifier 2 is decreased further. If no color burst signal exists, as in the case of a monochrome television transmission, the level of the control voltage becomes very low and the color killer circuit 3 acts to automatically cut off the chrominance channel.

In the circuit shown in FIG. 1, the control voltage produced by the control circuit 10 is used as a common control voltage to control the ACC amplifier 2 and the color killer circuit 3. Thus, the control circuit 10 is simplified in its circuit construction. In other words, in order to provide the control voltage for the ACC amplifier 2 and the control voltage for the color killer circuit 3, there is no need to provide separate time constant circuits. This is particularly advantageous when the chrominance channel is formed as an integrated circuit because it is preferred that a capacitor for the time constant circuit not be connected externally to the integrated circuit. It is also preferred that independent output terminals for the integrated circuit be reduced, thereby avoiding an increase in the number of external terminals of the integrated circuit. Thus, there is a great advantage if the control voltage is supplied commonly to the ACC amplifier 2 and the color killer circuit 3 as described above.

Since the control voltage for the ACC amplifier 2 is produced by detecting the color burst signal, it is necessary that the output of the color burst detector circuit 9 be held during a time interval of the vertical blanking period within which no color burst signal is present. Also it is required that the color killer circuit 3 cut off the chrominance channel immediately after the color burst signal is not received or present. For example, in the case where color television transmission channels and monochrome television transmission channels are both present, when reception is changed from the color television transmission channel to the monochrome television transmission channel, if the color killer operation is delayed, color noise appears in the monochrome picture which is disturbing to a viewer.

It is preferred to make the control voltage circuit as an integrated circuit so that the control voltage can be used commonly for the ACC amplifier 2 and the color killer circuit 3, but this results in the above problem.

An example of the present invention, in which a control voltage is used commonly control both the ACC amplifier and color killer circuit but avoids the above-mentioned problem, will be described with reference to FIG. 2 which shows an example of the control circuit 10 of the invention shown in FIG. 1.

Figure 2:
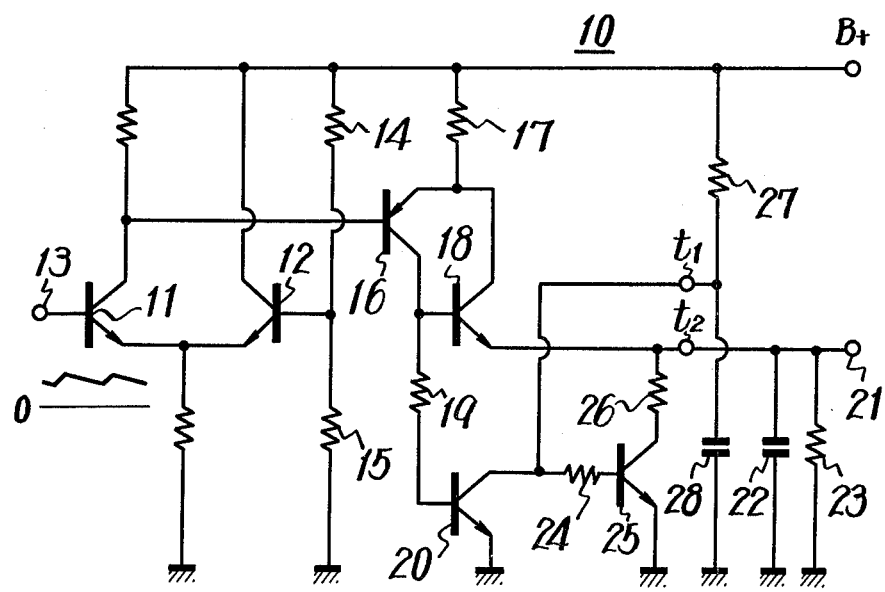
FIG. 2 is a schematic diagram showing an example of the present invention.

In FIGS. 2, 11 and 12 designate transistors which form a differential amplifier. The base of one of the transistors or transistor 11 in the illustrated example is supplied through the input terminal 13 with the detected output (which is a positive pulsated voltage upon the presence of the color burst signal) from the burst signal detector circuit 9, while the base of the other transistor 12 is supplied with a fixed DC voltage or reference voltage which is determined by resistors 14 and 15 from a power supply terminal B+. The output voltage derived from the collector of the transistor 11 of the differential amplifier is supplied to the base of a PNP-type transistor 16 (the other transistors used in the example of FIG. 2 are all of an NPN-type). The emitter of the transistor 16 is connected through a resistor 17 to the power supply terminal B+ and its collector is connected to the base of a transistor 18 and connected through a resistor 19 to the base of a transistor 20. The collector of the transistor 18 is connected through the resistor 17 to the power supply terminal B+ and its emitter is connected to the output terminal 21. The emitter of the transistor 18 is also connected with a time constant circuit formed of a capacitor 22 and a resistor 23 which are connected in parallel with each other. The emitter of the transistor 20 is grounded and the collector thereof is connected through a resistor 24 to the base of a transistor 25. The emitter of the transistor 25 is grounded and the collector thereof is connected to the emitter of the transistor 18 through a resistor 26 whose resistance value is selected to be small (or which can be omitted). The collector of the transistor 20 is also connected through a resistor 27 to the power supply terminal B+ and is grounded through a capacitor 28. In FIG. 2, $t_1$ and $t_2$ designate external terminals to which the capacitors 22 and 28 are connected externally and from which the output terminal 21 is led out when the differential amplifier consisting of the transistors 11, 12 and so on are made as an integrated circuit.

In the control circuit 10 constructed as shown in FIG. 2, when the color burst signal is present and the detected output signal of the burst signal detector circuit 9, which is supplied to the input terminal 13, is higher than a reference voltage (base voltage of the transistor 12), a current corresponding to the level of the detected output signal flows through the differential amplifier and the transistors 16, 18 to the capacitor 22. As a result, a control voltage produced at the output terminal 21 is in proportion to the level of the color burst signal. Since the gain of the ACC amplifier 2 is controlled by the control voltage produced at the output terminal 21 as shown in FIG. 1, the level of the chrominance signal is made constant. When the ACC operation is carried out, the transistor 20 is in ON-state. Thus, the transistor 25 is made OFF. As a result, the discharge time constant of the time constant circuit is determined by the values of the capacitor 22 and resistor 23.

When the detected output signal supplied to the input terminal 13 becomes lower the reference voltage due to the fact that the color burst signal is not present or its level is very low, the transistor 11 becomes OFF. As a result, the transistors 16, 18 and 20 become OFF and hence the transistor 25 becomes ON. Thus, the charge stored in the capacitor 22 is discharged rapidly through the resistor 26 of small resistance value, transistor 25 and resistor 23. As a result, the level of the control voltage at the output terminal 21 becomes substantially zero in a short period of time, and the chrominance channel is cut off by the color killer circuit 3 which is supplied with the control voltage as shown in FIG. 1.

In the example of FIG. 1, since the resistor 27 and capacitor 28 are used, when the transistor 20 becomes OFF, the base voltage of the transistor 25 becomes high at the time constant determined by the resistor 27 and capacitor 28 (which time constant is shorter than that determined by the capacitor 22 and resistor 23). The reason for this is to avoid having transistors 11, 12, 16, 18, 20 and 25 carry out a switching operation repeatedly in a short period of time. Consequently, this also prevents the chrominance channel from becoming unstable in the case where the detected output signal (from detector 9), which is a pulsated signal, is small due to a feeble electric field or the like.

As may be apparent from the above description, according to the present invention the ACC amplifier 2 and the color killer circuit 3 are supplied with the common control voltage, so that two sets of time constant circuits are not necessary and hence the circuit construction of the control circuit 10 can be simplified. As a result, when the circuitry is made as an integrated circuit, the number of external terminals required therefor can be decreased.

Further, with the present invention when the ACC operation is carried out, the discharge time constant of the time constant circuit (consisting of the capacitor 22 and the resistor 23) is long and the level of the control voltage can be held to some extent during the period in the vertical blanking period where no color burst signal exists, while the color killer operation can be started immediately after the level of the color burst signal becomes lower than the predetermined value. Thus, when reception is changed from a color television transmission channel to a monochrome television transmission channel, the so-called color noise can be prevented from appearing on the reproduced picture.

A single preferred embodiment of the present invention is described and shown in the foregoing, but it may be apparent that many modifications and variations could be made by one skilled in the art without departing from the spirit or scope of the novel concepts of the present invention.

We claim as our invention:

1. Apparatus for use in a color television receiver of the type including circuitry for processing a composite television signal, said receiver including a chrominance channel having a gain controllable chrominance amplifier for selectively amplifying chrominance signals and color burst signals transmitted with said composite signal during a color television transmission, said apparatus comprising:
   a. a burst level detector connected to said chrominance amplifier for detecting the level of said burst signals;
   b. a control circuit including a time constant circuit connected to said burst level detector for deriving a control signal in response to said detected burst signal;
   c. first means for supplying said control signal to said chrominance amplifier for controlling the gain thereof;
   d. second means responsive to said control signal for activating said chrominance channel when the level of said control signal goes over a predetermined level and inactivating said chrominace channel when the level of said control signal goes below said predetermined level, and
   e. means connected between said burst level detector and said time constant circuit for shortening the time constant of said time constant circuit when the level of the output signal of said burst level detector goes below a predetermined level.

2. Apparatus as claimed in claim 1, wherein said time constant circuit includes a capacitor and said last-named means includes a switching device connected in parallel with said capacitor and said switching means is made conductive when the level of the output signal from said burst level detector goes below said predetermined level.

* * * * *